(12) United States Patent
Schmidt et al.

(10) Patent No.: US 11,426,790 B2
(45) Date of Patent: Aug. 30, 2022

(54) PRINTING-ENHANCED CASTING CORES

(71) Applicant: Raytheon Technologies Corporation, Farmington, CT (US)

(72) Inventors: Wayde R. Schmidt, Pomfret Center, CT (US); Paul Sheedy, Bolton, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/346,707

(22) Filed: Jun. 14, 2021

(65) Prior Publication Data

US 2021/0308746 A1 Oct. 7, 2021

Related U.S. Application Data

(62) Division of application No. 15/723,591, filed on Oct. 3, 2017, now Pat. No. 11,033,955.

(51) Int. Cl.
| | |
|---|---|
| *B22C 9/10* | (2006.01) |
| *B28B 7/34* | (2006.01) |
| *B22C 9/24* | (2006.01) |
| *B22C 9/12* | (2006.01) |
| *F01D 5/18* | (2006.01) |

(Continued)

(52) U.S. Cl.
CPC ............ *B22C 9/103* (2013.01); *B22C 9/10* (2013.01); *B22C 9/12* (2013.01); *B22C 9/24* (2013.01); *B28B 7/346* (2013.01); *F01D 5/187* (2013.01); *F01D 25/12* (2013.01); *F01D 5/20* (2013.01); *F01D 11/08* (2013.01); *F02C 7/12* (2013.01); *F05D 2230/10* (2013.01); *F05D 2230/211* (2013.01); *F05D 2230/22* (2013.01); *F05D 2230/30* (2013.01); *F05D 2260/202* (2013.01); *F05D 2260/213* (2013.01); *F05D 2260/22141* (2013.01)

(58) Field of Classification Search
CPC .. B22C 9/103; B22C 9/10; B22C 9/12; B22C 9/24; B28B 7/346; F01D 5/187; F01D 25/12; F01D 5/20; F01D 11/08; F02C 7/12; F05D 2230/10; F05D 2230/211; F05D 2230/22; F05D 2230/30; F05D 2260/202; F05D 2260/213; F05D 2260/22141
See application file for complete search history.

(56) References Cited

U.S. PATENT DOCUMENTS

| | | | |
|---|---|---|---|
| 5,238,752 A | * | 8/1993 | Duderstadt ............ C23C 28/00 428/623 |
| 5,340,656 A | | 8/1994 | Sachs |

(Continued)

*Primary Examiner* — Lee A Holly
(74) *Attorney, Agent, or Firm* — Getz Balich LLC

(57) ABSTRACT

Aspects of the disclosure are directed to treating a substrate, the substrate including at least one of a refractory metal or a ceramic material, and depositing a media onto the treated substrate to generate a casting core. Embodiments include a fixture, a substrate located on the fixture, the substrate including at least one of a refractory metal or a ceramic material, and a delivery head that deposits media onto the substrate to generate a casting core. Aspects are directed to a core configured for casting a component, the core comprising: a substrate that includes at least one of a refractory metal or a ceramic material, and media deposited on the substrate, the media having a dimension within a range of between 0.5 and 100 micrometers.

11 Claims, 8 Drawing Sheets

(51) Int. Cl.
  *F01D 25/12* (2006.01)
  *F02C 7/12* (2006.01)
  *F01D 11/08* (2006.01)
  *F01D 5/20* (2006.01)

(56) References Cited

U.S. PATENT DOCUMENTS

| | | |
|---|---|---|
| 6,588,484 B1 | 7/2003 | Fosaaen |
| 7,302,990 B2 | 12/2007 | Bunker |
| 9,079,803 B2 | 7/2015 | Xu |
| 9,381,564 B2 | 7/2016 | McGuire |
| 2003/0206819 A1* | 11/2003 | Talia ............... B22F 7/064 419/8 |
| 2005/0133193 A1 | 6/2005 | Beals |
| 2006/0086478 A1 | 4/2006 | Persky |
| 2006/0086479 A1* | 4/2006 | Parkos, Jr. ......... C23C 28/322 164/369 |
| 2007/0017654 A1 | 1/2007 | Parkos, Jr. |
| 2007/0235157 A1 | 10/2007 | Bunker |
| 2008/0000611 A1 | 1/2008 | Bunker |
| 2009/0000754 A1* | 1/2009 | Piggush ............... B22C 9/103 164/15 |
| 2012/0148769 A1 | 6/2012 | Bunker |
| 2015/0306657 A1* | 10/2015 | Frank ............... C04B 35/185 164/369 |
| 2016/0017724 A1 | 1/2016 | Xu |
| 2016/0151829 A1 | 6/2016 | Propheter-Hinckley |
| 2017/0113265 A1 | 4/2017 | Slavens |
| 2017/0122109 A1 | 5/2017 | Bunker |
| 2017/0211415 A1 | 7/2017 | Swift |
| 2017/0226362 A1* | 8/2017 | Fratello ............ C09D 11/037 |
| 2017/0246679 A1* | 8/2017 | Bunker ............... B28B 1/001 |
| 2017/0252851 A1 | 9/2017 | Fulop |
| 2017/0304888 A1* | 10/2017 | Castle ................ B22D 29/002 |
| 2018/0345357 A1 | 12/2018 | Cendrowicz |
| 2019/0040532 A1* | 2/2019 | Baytekin-Gerngross ............ H01B 1/023 |

* cited by examiner

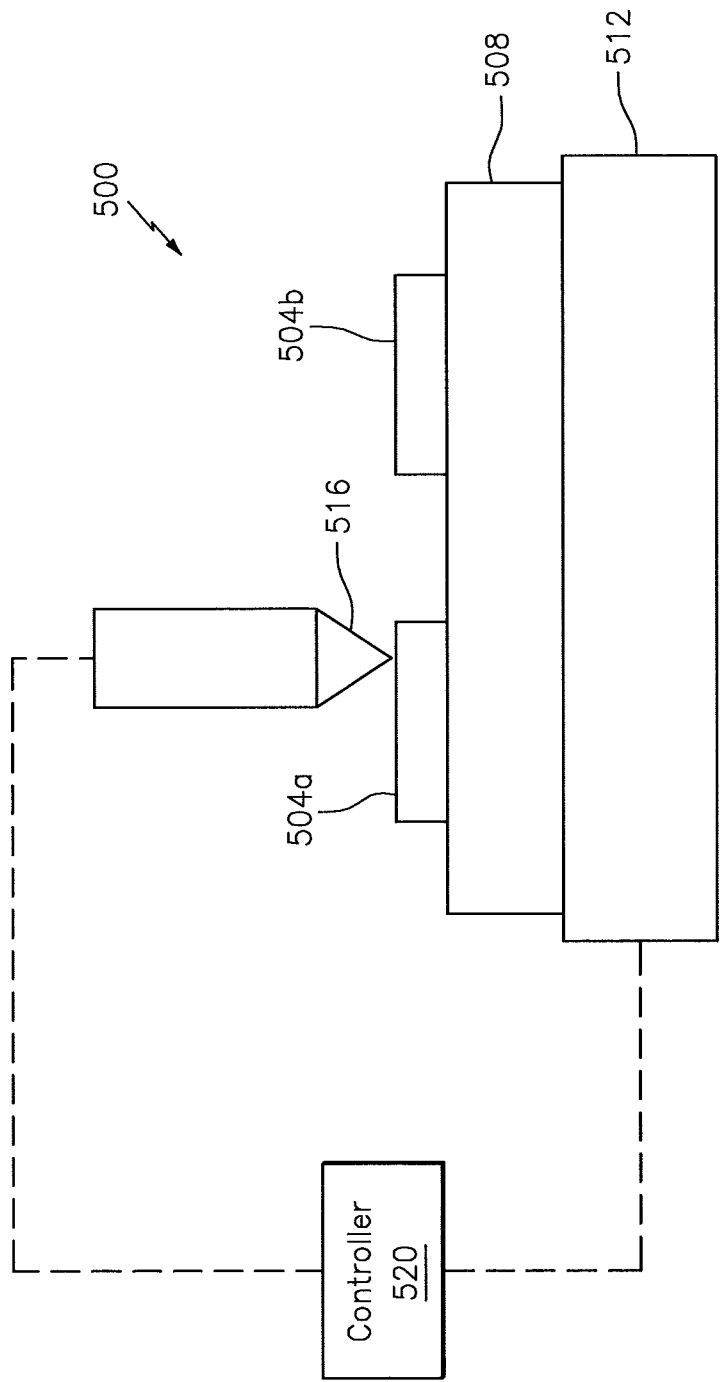

PRINTING-ENHANCED CASTING CORES

This application is a divisional of U.S. patent application Ser. No. 15/723,591 filed Oct. 3, 2017, which is hereby incorporated herein by reference in its entirety.

BACKGROUND

Gas turbine engines, such as those for aircraft propulsion and industrial power generation, employ a compressor to compress air that is drawn into the engine and a turbine to capture energy associated with the combustion of a fuel-air mixture. Components of the engine, such as turbine blades, are frequently manufactured using an investment casting technique. In investment casting, internal passages may be produced by pre-fabricating ceramic cores that represent positive replica of the passages. The cores are assembled together and placed in an injection die to create wax patterns with the ceramic embedded therein. These patterns are then assembled as part of a cluster to create a hollow ceramic shell. The wax is then removed (e.g., melted) from the interior of the shell, leaving the ceramic cores locked inside. After preparation of the shell, molten metal is cast into the ceramic shell and solidified. The ceramic shell is removed (e.g., mechanically removed) from the cluster of cast metal parts and the ceramic cores are removed (e.g., chemically removed), thereby creating the passages.

As features (e.g., the aforementioned passages) of the components become more complex in terms of, e.g., shape or dimension, the investment casting technique described above becomes less effective due to the fragile nature of the ceramic cores. Refractory metals may be used to make the cores. These refractory metal cores (RMCs) enable features of greater complexity to be fabricated (relative to the use of conventional ceramic cores) due to higher strength when possessing intricate, fine features. RMCs are typically fabricated by punching, stamping, or laser drilling details into sheet metal. A coating (usually ceramic) is used to protect the refractory metal from oxidation during a shell-firing procedure of the investment casting; the coating also prevents dissolution of the RMC in the presence of the molten casting metal. The RMCs may be used as the core itself; the RMCs may be combined with ceramic cores to produce hybrid cores.

Further refinement of the techniques used to produce components (e.g., passages of a component) of the type described above is needed. For example, such refinement is necessary in order to enable further reduction in feature size and increased complexity in terms of, e.g., geometric structure.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method comprising: treating a substrate, the substrate including at least one of a refractory metal or a ceramic material, and depositing a media onto the treated substrate to generate a casting core. In some embodiments, the media is deposited onto the treated substrate using at least one of: screen printing, aerosol jet printing, extrusion-based printing, filament-based extrusion, ink-based printing, slurry-based printing, plasma-based deposition, vapor delivery, or micro-cold spray deposition. In some embodiments, the media includes at least one of: a refractory metal, a refractory ceramic, a conductive metal, a dielectric, a metal superalloy, a shape memory alloy, a metallic glass, a phase change material, a wax, a preceramic polymer, an organic polymer blend, a reactive metal, a low melting compound, a carbon-based material, or reactive phases. In some embodiments, the treating of the substrate includes plasma cleaning the substrate. In some embodiments, the treating of the substrate includes bending, twisting, folding, or cutting the substrate into a form suitable for casting a component. In some embodiments, the method further comprises: processing the casting core, where the processing applies to at least a portion of the casting core and includes at least one of applying a thermal or non-thermal heating technique, dissolving, exposing to a plurality of pressures and reactive or relatively inert gaseous atmospheres at defined temperatures and exposure times, or applying a chemical solution to remove at least a portion of the media. In some embodiments, the method further comprises: depositing the media as a trace or a ring on the substrate. In some embodiments, the method further comprises: installing the casting core into a mold, and casting a component using the mold. In some embodiments, the component is configured for use in an engine and is one of: a blade, a vane, a turbine shroud, an end wall, an exhaust nozzle, and a liner. In some embodiments, the component is a turbine blade, and where the casting core forms a passage in the turbine blade.

Aspects of the disclosure are directed to a system comprising: a fixture, a substrate located on the fixture, the substrate including at least one of a refractory metal or a ceramic material, and a delivery head that deposits media onto the substrate to generate a casting core. In some embodiments, the method further comprises: a controller that causes at least one of the fixture or the delivery head to move relative to the other of the fixture or the delivery head. In some embodiments, the controller stores a specification of the media in terms of at least one of a dimension of the media or a location of the media relative to the substrate, and where the controller causes the at least one of the fixture or the delivery head to move in accordance with the specification. In some embodiments, the system further comprises: a mold, the mold including a shell and the casting core, and a metal superalloy located in the mold.

Aspects of the disclosure are directed to a core configured for casting a component, the core comprising: a substrate that includes at least one of a refractory metal or a ceramic material, and media deposited on the substrate, the media having a dimension within a range of between 0.5 and 100 micrometers. In some embodiments, the media includes at least one of a ceramic, a metal, a metal alloy, an intermetallic compound, carbon, glass, or a polymer. In some embodiments, the media forms a conductive trace on the substrate.

BRIEF DESCRIPTION OF THE DRAWINGS

The present disclosure is illustrated by way of example and not limited in the accompanying figures in which like reference numerals indicate similar elements. The figures are not necessarily drawn to scale unless specifically indicated otherwise.

FIG. 5A illustrates a schematic, side perspective view of a system that may be used to manufacture a core in accordance with aspects of this disclosure.

DETAILED DESCRIPTION

Figure 1:
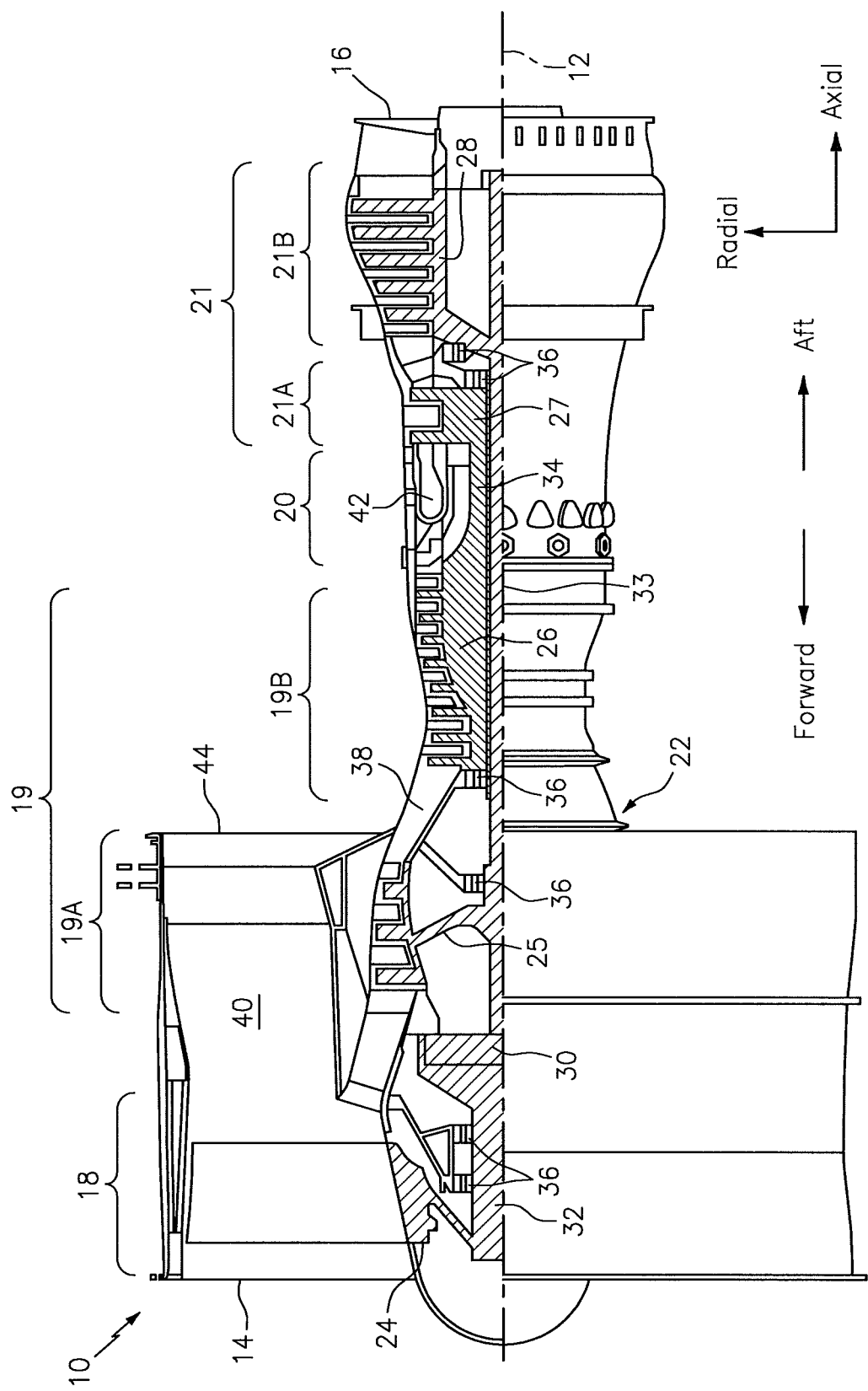
FIG. 1 is a side cutaway illustration of a geared turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

As described further below, aspects of this disclosure may be used to address weaknesses/deficiencies associated with conventional manufacturing techniques. For example, aspects of the disclosure may be used to address the fragility of ceramics that have been used in the manufacture of multi-wall passages of a component. In some embodiments, a direct write technique may be used. A direct write technique is a technique that is included in a set of deposition techniques that enable delivery of multiple/hybrid materials, in multiple layers, at high resolution onto flat, folded, or bent and conformal surfaces. A direct write technique may include (aspects of) one or more of: screen printing, aerosol jet printing, extrusion-based printing, filament-based extrusion, ink-based printing, slurry-based printing, plasma-based deposition, vapor delivery and micro-cold spray deposition.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
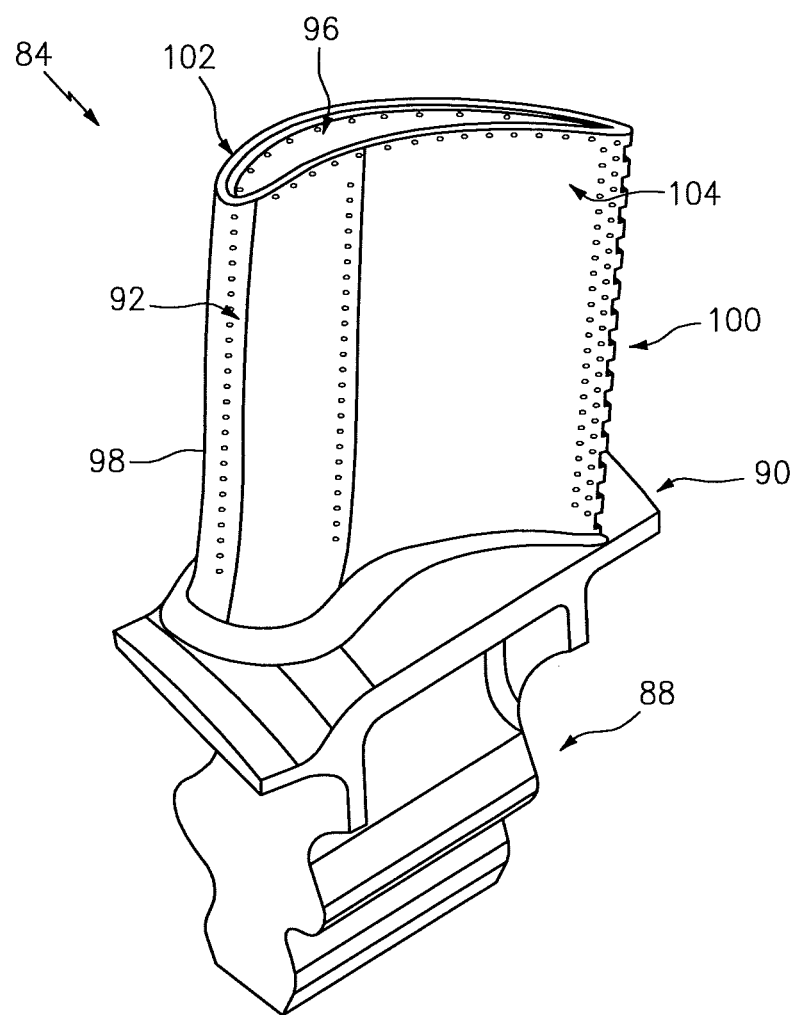
FIG. 2 illustrates a turbine blade in accordance with aspects of this disclosure.

FIG. 2 illustrates a turbine blade 84 in accordance with aspects of the disclosure. The blade 84 may be included as part of the turbine section 21 of the engine 10 of FIG. 1. The blade 84 may include a root 88, a platform 90 and an airfoil 92. The root 88 may be inserted into a disk of the turbine section 21. The platform 90 may separate the root 88 and the airfoil 92 to define an inner boundary of a gas path. The airfoil 92 may define a blade chord between a leading edge 98, which may include various forward and/or aft sweep configurations, and a trailing edge 100. A first sidewall 102 may be convex to define a suction side, and a second sidewall 104 may be concave to define a pressure side. The sidewalls 102 and 104 may be joined at the leading edge 98 and at an axially spaced trailing edge 100. A tip 96 may extend between the sidewalls 102 and 104 opposite the platform 90.

Figure 3:
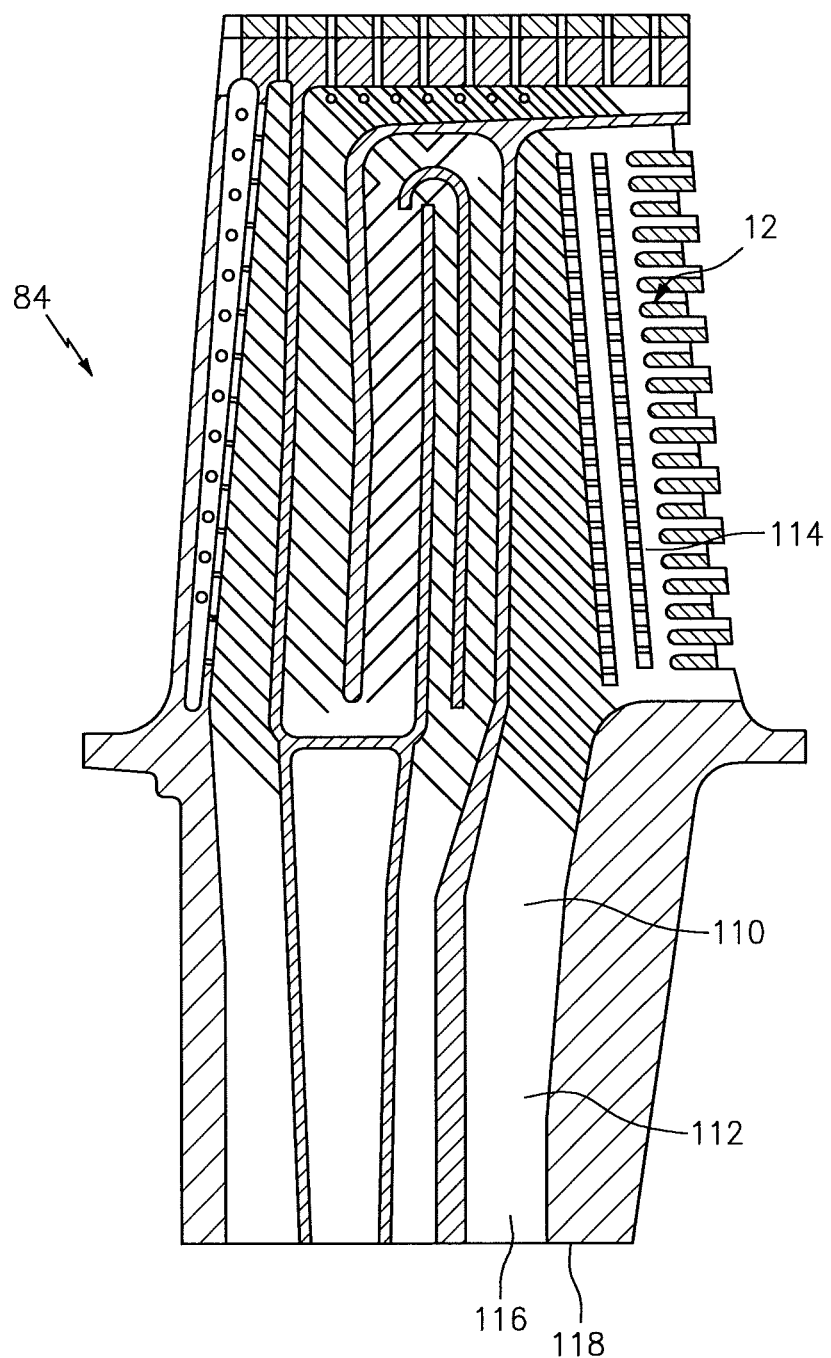
FIG. 3 illustrates an internal circuit formed in the turbine blade of FIG. 2.

To resist the high temperature stress environment in the gas path of the engine, the blade 84 may be formed by casting. It should be appreciated that although a blade 84 with an internal cooling circuit 110 (shown schematically; FIG. 3) is described and illustrated in detail, other components including, but not limited to, vanes, turbine shrouds, end walls, exhaust nozzles, and liners may be manufactured/fabricated in accordance with aspects of this disclosure.

With reference to FIG. 3, the internal cooling circuit 110 may include a feed passage 112 that communicates airflow into a trailing edge cavity 114 within the airfoil 84. It should be appreciated that the internal cooling circuit 110 may be of various geometries, and include various features. The feed passage 112 may be the aft most passage that communicates cooling air to the trailing edge cavity 114. The feed passage 112 may receive cooling flow through at least one inlet 116 within a base 118 of the root 88.

Features of the blade 84 (e.g., the cooling circuit 110) may be intricate and/or complex, such that the manufacture/fabrication of such features may be difficult using conventional techniques. Aspects of the disclosure are directed to techniques that may be used to manufacture such features.

Figure 4:
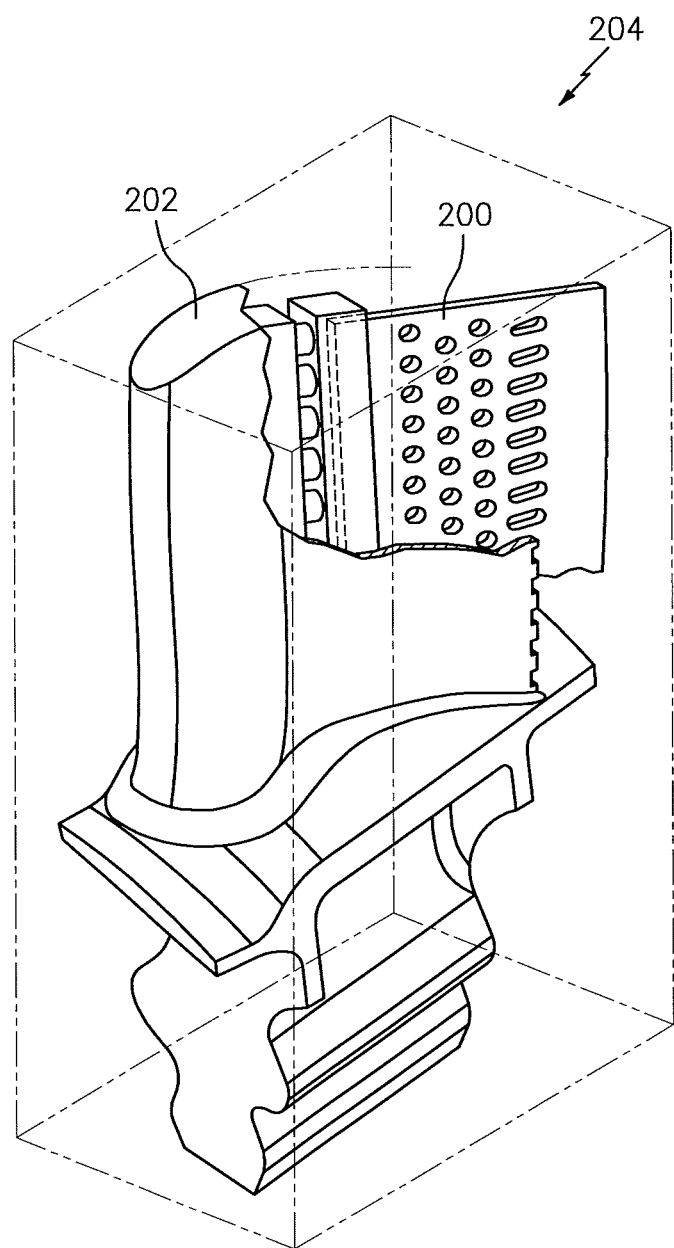
FIG. 4 illustrates a core and a shell of a mold that may be used to manufacture a component in accordance with aspects of this disclosure.

To form the internal cooling circuit 110, a core 200 may be positioned within a shell 202 (see FIG. 4). The shell 202 may define the outer surface of the blade 84 while the core 200 may form internal surfaces, such as surfaces that define the internal cooling circuit 110 (FIG. 3). During an investment casting procedure, the core 200 may fill a selected volume within the shell 202 that, when removed from the finished blade casting, defines the internal cooling circuit 110 utilized for cooling airflow.

The shell 202 and the core 200 may define a mold 204 to cast the exterior and interior geometries that may be formed of refractory metals, ceramics, or hybrids thereof. The mold 204 may operate as a melting unit and/or a die for a material that forms the blade 84. The material may include, but not be limited to, one or more of: a super alloy or other material such as a nickel based super alloy, a cobalt based super alloy, an iron based super alloy, a molten super alloy that is solidified, or other material.

Referring to FIG. 5A, a system 500 is shown. The system 500 may be used to apply media (e.g., media 504a and 504b) to a substrate 508. The substrate 508 may be located on a fixture 512. The media 504a/504b may be applied to the substrate 508 via a delivery head 516. The delivery head 516 may store the material of the media 504a/504b or may obtain that material from another source (not shown). Also, while a single delivery head 516 is shown in FIG. 5A, in some embodiments more than one delivery head may be included; the delivery heads may provide the same type (e.g., material) of media or different media.

In some embodiments, the substrate 508 may be an existing core, such as for example an RMC core, a ceramic core, or a hybrid version of such cores. The combination of the media 504a and 504b and the substrate 508 may form a core (e.g., core 200 of FIG. 4) that may be subsequently used in an investment casting procedure to fabricate a component (e.g., blade 84 of FIG. 2). In this manner, the media 504a/504b may enhance a core (relative to, e.g., simply using the substrate 508 as the core itself).

In accordance with aspects of the disclosure, media 504a/504b sizes as small as, e.g., one tenth of a micrometer and as large as, e.g., several centimeters, may be generated. In some embodiments, a dimension of media 504a/504b may range between 0.5 and 500 micrometers, potentially as part of a single pass of a direct write manufacturing system (e.g., the delivery head 516). In some embodiments, a powder, solution, gas, slurry, mixture, or other feedstock may be used as the media 504a/504b to provide/generate a feature in accordance with one or more specifications that may be present/stored in, e.g., a controller 520 in one or more formats.

Various materials may be used to deposit the media 504a/504b. For example, such materials may include one or more of a ceramic, a metal, a metal alloy, an intermetallic compound, carbon, glass, or a polymer. Such materials may be used (e.g., directly) to provide both planar and nonplanar geometries and organization/structure to a core. In some embodiments, the materials may be used as surrogates that are subsequently removed during a phase of a processing/investment casting.

Materials that may be used for printing/deposition of the media 504a/504b include refractory metals (e.g., Mo, Zr, Ta, W, etc.), refractory ceramics (e.g., SiC, $Si_3N_4$, SiOC, HfC, $Al_2O_3$ and other oxides, including refractory glasses, etc.), conductive metals (e.g., Cu, Ag, Pt, Pd, Au, etc.), dielectrics, metal superalloys, shape memory alloys, bulk metallic glasses, phase change materials, etc. Sacrificial materials that may be used include waxes, preceramic polymers, organic polymer blends, reactive metals, low melting compounds, carbon-based materials and reactive phases. In some embodiments, a complete removal of a material may be provided (e.g., oxidation to remove carbon structures) during a manufacturing procedure. In some embodiments, a partial removal of a material may be provided (e.g., phase change of material or preceramic material which leaves behind residual ceramic upon further processing) during a manufacturing procedure. It should be understood that intentional porosity in a deposited material is included and is considered for aid in post processing operations such as core removal.

In some embodiments, the delivery head 516 may be configured to move relative to the fixture 512 to apply the media of the features 504a and 504b to the substrate 508. In some embodiments, the delivery head 516 may be stationary and the fixture 512 may be configured to move. In some embodiments, the fixture 512 may be stationary and the delivery head 516 may be configured to move. In some embodiments, both the fixture 512 and the delivery head 516 may be configured to move. In some embodiments, the delivery head 516 and the substrate 508 may be temperature controlled.

In some embodiments, the controller 520 may be used to regulate a movement of the fixture 512 and/or a movement of the delivery head 516. In some embodiments, the controller 520 may be used to control delivery of media 504a/504b and the rate of delivery of media to delivery head 516. In some embodiments, the controller 520 may include one or more of the components/devices described below in conjunction with FIG. 7.

Figure 5B:
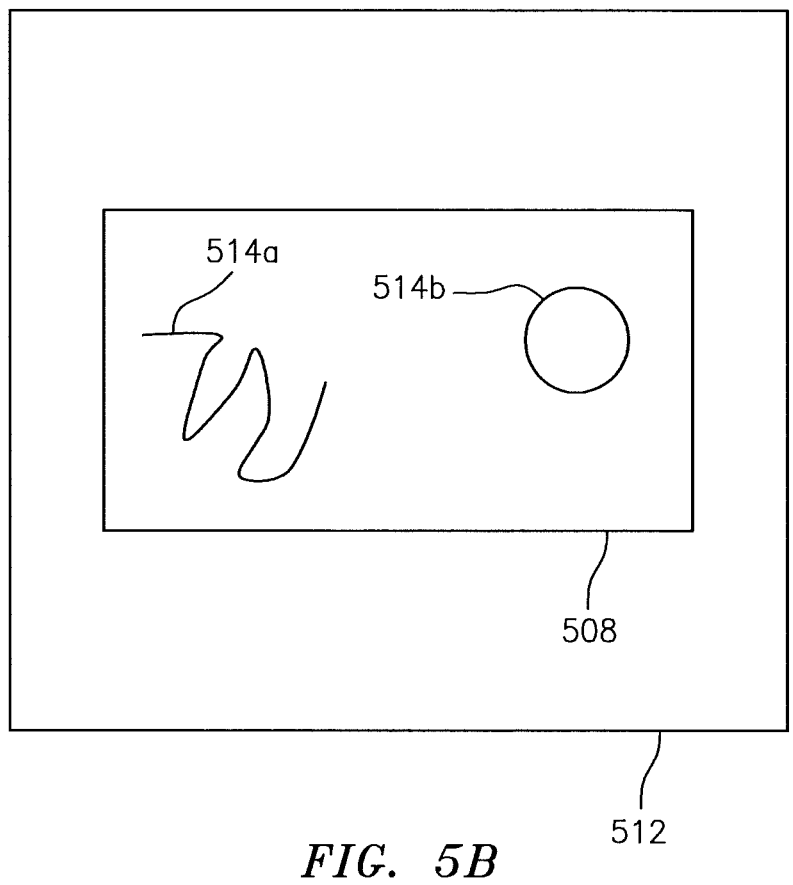
FIG. 5B illustrates a portion of the system of FIG. 5A from a top/overhead perspective.

FIG. 5B illustrates a portion of the system 500 of FIG. 5A, where the delivery head 516 and the controller 520 are omitted for the sake of clarity in illustration. As shown in FIG. 5B, a feature 514a (which may be formed at least partially on the basis of media 504a) may correspond to a trace (e.g., a conductive trace) formed (e.g., printed) on the substrate 508. A feature 514b (which may be formed at least partially on the basis of the media 504b) may correspond to a ring formed (e.g., printed) on the substrate 508. The particular shapes/form-factors of the features 514a and 514b shown in FIG. 5B are illustrative; other shapes/form-factors may be used. Furthermore, a variety of materials may be used to form the features 514a/514b, including for example one or more of copper, platinum, palladium, molybdenum, nichrome, aluminum nitride, silicon carbide, boron nitride, carbon, etc.

Figure 6:
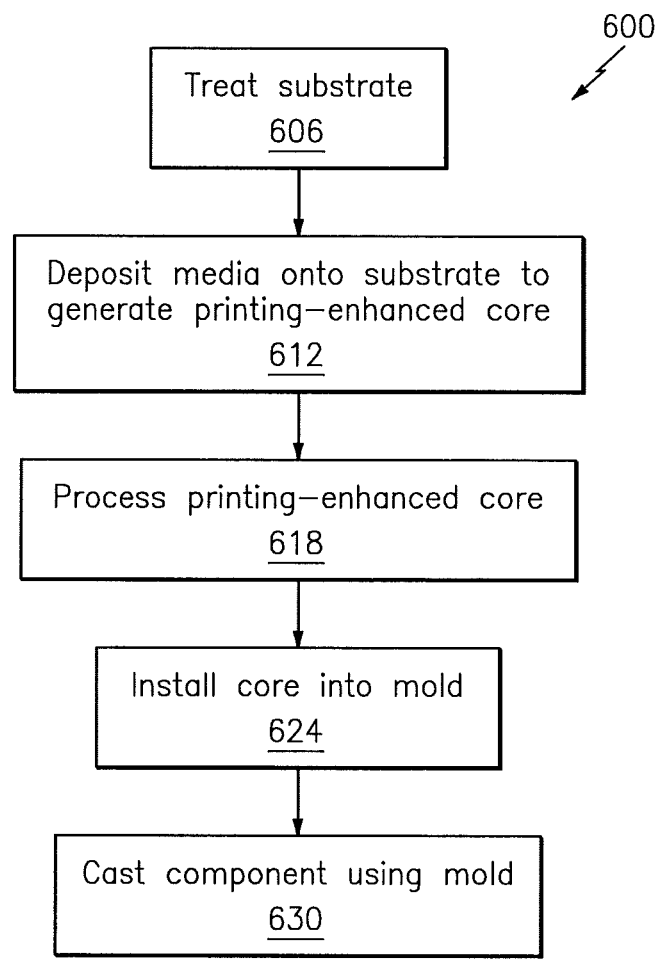
FIG. 6 illustrates a flow chart of an exemplary method in accordance with aspects of this disclosure.

Referring now to FIG. 6, a flow chart of a method 600 is shown. The method 600 is described below in conjunction with the various structural entities described herein for the sake of ease in explanation. One skilled in the art will appreciate that the method 600 may be adapted to accommodate other structural entities.

In block 606, the substrate 508 may be treated. For example, as part of block 606, the substrate 508 may be subjected to plasma cleaning to enhance bonding between the media 504a/504b and the substrate 508. In some embodiments, block 606 may include bending, twisting, folding, or cutting the substrate 508 into a form suitable for casting a component (e.g., the blade 84 of FIG. 2).

In block 612, the media 504a/504b may be deposited onto the substrate 508 via, e.g., the delivery head 516. The deposition of block 612 may conform to/include a direct write technique as described herein. The deposition of the media 504a/504b onto the substrate 508 may create/generate a printing-enhanced casting core.

In block 618, the printing-enhanced casting core of block 612 may be subject to processing. For example, the processing of block 618 may include application of a thermal or non-thermal heating technique (e.g. infrared, microwave, plasma, induction, resistive, etc.) to remove a portion of the media 504a/504b from the printing-enhanced casting core to create a residual structure for casting. In another example, the processing of block 618 may include exposure to various pressures and reactive or relatively inert gaseous atmospheres at defined temperatures and exposure times. Printed/deposited features associated with the media 504a/504b may be modified with selective dissolution, chemical etching, etc., to modify the microstructure of the deposited features. In some embodiments, the block 618 may include bending, twisting, folding or cutting the substrate 508 into a form suitable for casting. At the completion of the block 618, a core may be created/generated that may be used as part of a casting technique (e.g., an investment casting technique). Processing of block 618 may involve a single operation or multiple operations that are the same or different.

In block 624, the core (of block 612 or block 618) may be installed/assembled into a mold (e.g., mold 204 of FIG. 4).

In block 630, a component (e.g., the blade 84) may be cast using the mold of the block 624. For example, the block 630 may include one or more of pouring/depositing molten metal into the mold, allowing the metal to solidify. In some embodiments, the core may be removed from the solidified metal to provide, e.g., passages in the component.

Figure 7:
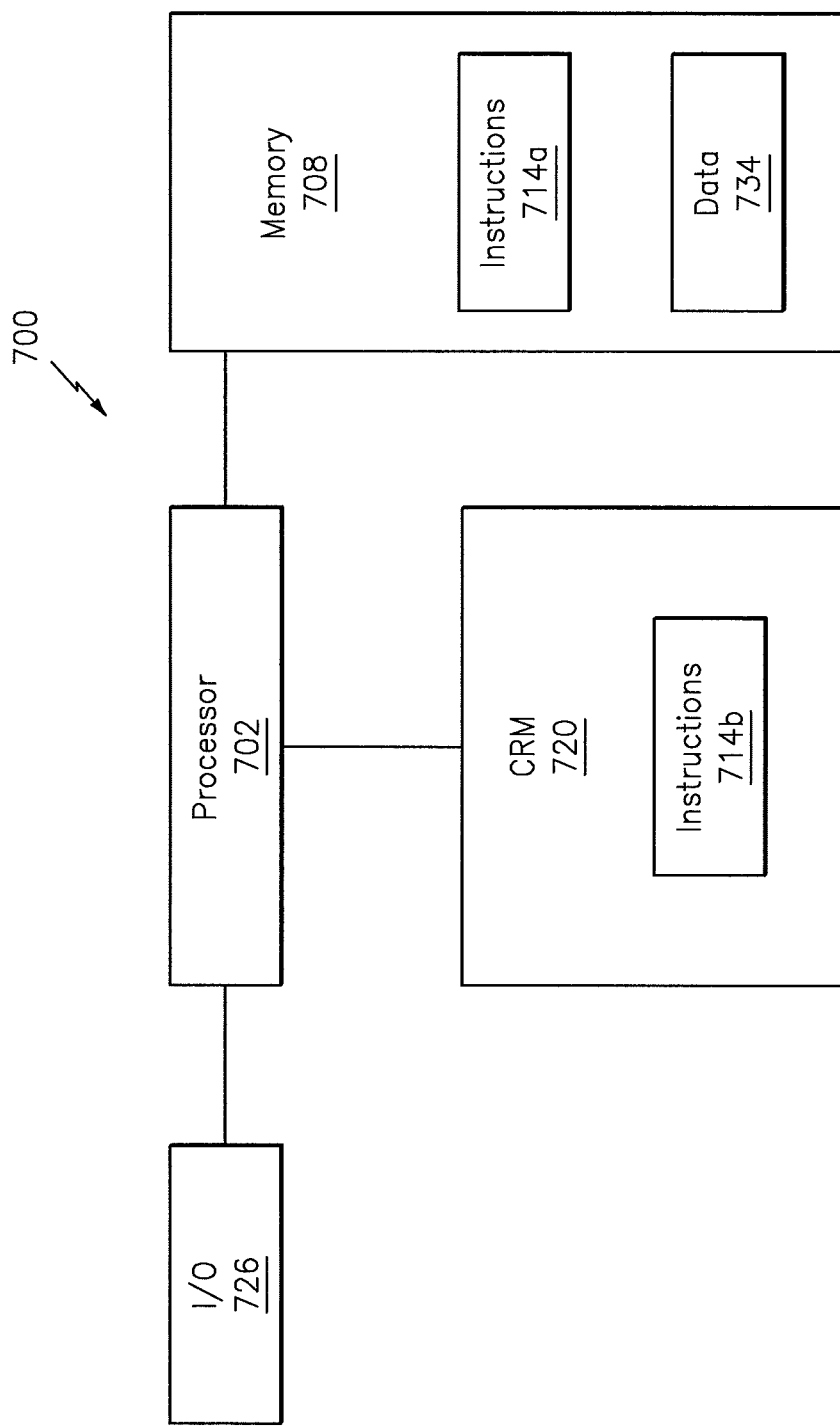
FIG. 7 illustrates a computing system in accordance with aspects of this disclosure.

Referring to FIG. 7, a computing system 700 that may be used in some embodiments is shown. The system 700 may be incorporated as part of another system, apparatus, component, etc. For example, aspects of the system 700 may be included as part of one or more of the system 500 (e.g., the controller 520) of FIG. 5A.

The system 700 may include a processor 702 and a memory 708. The memory 708 may store instructions (e.g., instructions 714a) that, when executed by the processor 702, may cause the system 700 to perform one or more methodological acts, such as one or more of the acts described herein. At least a portion of the instructions (e.g., instructions 714b) may be stored on a computer-readable medium (CRM) 720, such as for example a non-transitory CRM. The instructions 714b of the CRM 720 may be used as an alternative to, or in addition to, the use of the instructions 714a of the memory 708. One or both of the memory 708 and the CRM 720, taken individually or collectively, may be referred to as a storage device. Much like the CRM 720, the storage device may be non-transitory in nature.

In some embodiments, the system 700 may include one or more input/output (I/O) devices 726. The I/O devices 726 may provide an interface between the system 700 and one or more other components or devices. The I/O devices 726 may include one or more of a graphical user interface (GUI), a display screen, a touchscreen, a keyboard, a mouse, a joystick, a pushbutton, a microphone, a speaker, a transceiver, a delivery head (e.g., delivery head 516 of FIG. 5A), etc. The I/O devices 726 may be used to output data in one or more formats.

The memory 708 may store data 734. The data 734 may include an identification of a material (e.g., a material of the substrate 508 and/or the media 504a/504b of FIG. 5A) and/or a mapping of the media 504a/504b to a location of the substrate 508, the fixture 512 or the delivery head 516. In some embodiments, the data 734 may be remotely located from, e.g., the processor 702 and may be accessible via one or more networks, communication channels, etc.

The system 700 is illustrative. The system 700 may be implemented using hardware, software, firmware, or any combination thereof.

Having just described various exemplary embodiments of the disclosure, some additional examples are described below and are labelled as examples A-E. These examples A-E are illustrative and are provided to highlight various options that are available in accordance with aspects of this disclosure. Furthermore, while the examples are described separately for the sake of ease in explanation, aspects of the examples may be combined with one another and/or with the teachings associated with the embodiments described above. The examples are non-limiting and non-exhaustive.

Example A

In this example A, an RMC core may be obtained as a planar sheet (potentially formed as one or more layers of material) that is not yet cut/bent into a form suitable for casting. This core sheet may be used as a substrate upon which a series of geometries (e.g., cooling paths) may be printed in an ink formulation based on molybdenum using a microextrusion system. The ink may be printed and post-processed to remove optional carrier/binder material and to further bond the ink to the RMC substrate and to increase the relative density of the printed material. This 'printing-enhanced casting core' may then be cut and bent, twisted or folded to a specified geometry and shelled with ceramic slurry to support investment casting.

Example B

Example B is similar to example A; in this example B, screen printing may be used to deposit a first layer of refractory metal in a specified geometry onto an existing planar RMC. A second layer of protective oxide ceramic ink may then be screen printed on top of the refractory metal regions to encapsulate the metal and impart oxidation resistance for investment casting. Further cutting/bending/processing/casting may then be performed, depending on the robustness of the structure.

Example C

In example C, a wax feature set may be deposited onto an RMC (or a ceramic proto-core) using screen-printing or microextrusion. The entire structure may be shelled and the wax subsequently removed to leave behind a passage with a ceramic shell. This passage may be filled with metal following an investment casting operation.

Example D

In example D, a pre-bent RMC sheet that is designed for multi-planar cooling passages may be modified using an aerosol jet printing technique with refractory metal ink. The ink may be deposited conformally using a robotic/automated control to deliver/provide additional fine structure onto the surface of the RMC. This 'printing-enhanced casting core' may then be processed using investment casting techniques.

Example E

In some embodiments, a ceramic tape or a flexible sheet may be used as a substrate. Features may be generated based on a deposition of media/material (e.g., a ceramic or metal) onto the substrate.

Aspects of the disclosure may provide an ability to incorporate multi-dimensional features in a component that cannot be made using conventional techniques. For example, the component may include, e.g., contours, tapers, or any other feature/passage/hole/ornamentation that may not have been available previously. The use of a RMC (potentially in combination with one or more ceramic cores) may enable multiwall components to be fabricated. Such components may provide enhanced cooling and weight savings relative to counterpart, conventional components.

Aspects of the disclosure may include one or more of the following: a) direct write printing methods applied to create modified casting cores with one or more geometric designs having smaller features and increased complexity relative to cores formed using existing techniques, b) the ability to deliver enhanced structures on non-planar core structures in a conformal manner, c) a wide variety of material systems and processing techniques to further enhance base characteristics of existing cores, d) an ability to modify (e.g., spacially modify) structure, composition, functionality or combinations thereof by selectively printing in specific locations at a size scale smaller than current core features, and e) printed trace(s)/structure(s) can be uniquely described/specified for particular applications/environments.

As described above, aspects of the disclosure include an ability to deposit narrow, controlled traces using a variety of directed printing methods with a variety of materials. Various additional aspects of the disclosure, such as a tailoring/customization of the media deposit density and composition, may be realized through a selection and control of one or more of the following: a) media sizes, types, composition, b) feedstock forms (e.g., powder, liquid, gaseous, combinations thereof), c) printing technique(s), d) treatment of a core substrate (prior to or subsequent to application of the media), e) processing subsequent to application of the media to the substrate, or f) reactivity options.

As described herein, the use of a substrate may enhance manufacturing operations as the substrate may represent the bulk of the feature set associated with a core and may be relatively simple/quick to manufacture. The addition of media to supplement/embellish upon the substrate may enable the addition of enhanced features to the substrate/core, where the enhanced features may take the form of intricate, complex, and/or fine geometries.

While some of the examples/embodiments described herein pertain to components of an engine, aspects of the disclosure may be used to fabricate/manufacture other types of components. For example, aspects of the disclosure may be used to fabricate components used in communications equipment (e.g., computers and phones), such as for example antennas of such equipment.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An apparatus configured for casting a component, the apparatus comprising:
   a substrate comprising a ceramic material; and
   media deposited on a portion of a surface of the substrate, the surface formed by the ceramic material, the media having a dimension within a range of between 0.5 and 500 micrometers, and the media forming a conductive trace on the surface of the substrate;
   wherein the media comprises material that is removable while on the surface of the substrate by heat.

2. The apparatus of claim 1, further comprising a casting core comprising the substrate and the media.

3. The apparatus of claim 2, further comprising:
   a shell;
   the casting core configured to be disposed within the shell.

4. The apparatus of claim 3, further comprising metal superalloy arranged in a cavity within the shell and adjacent the casting core.

5. The apparatus of claim 2, wherein the casting core is configured for casting a component for an engine.

6. The apparatus of claim 5, wherein the component comprises a blade, a vane, a turbine shroud, an end wall, an exhaust nozzle or a liner.

7. The apparatus of claim 5, wherein the casting core is configured for casting a turbine blade where the casting core forms at least a passage within the turbine blade.

8. The apparatus of claim 1, wherein the media includes at least one of a ceramic, a metal, a metal alloy, an intermetallic compound, carbon, glass, or a polymer.

9. The apparatus of claim 1, wherein the media is a printed media.

10. The apparatus of claim 1, wherein the media comprises material with a microstructure that is modifiable by selective dissolution or chemical etching.

11. An apparatus configured for casting a component, the apparatus comprising:
    a substrate comprising a ceramic material; and
    media deposited on a portion of a surface of the substrate, the surface formed by the ceramic material, the media having a dimension within a range of between 0.5 and 500 micrometers, and the media forming a conductive trace on the surface of the substrate;
    wherein the media comprises polymer.

* * * * *